Sept. 25, 1962

H. L. BYLAND 3,055,292

QUICK SET PERFORATING APPARATUS

Filed Sept. 15, 1960

INVENTOR.
Henry L. Byland
BY
Wolfe, Hubbard, Voit & Osann
Attys.

Sept. 25, 1962 H. L. BYLAND 3,055,292
QUICK SET PERFORATING APPARATUS
Filed Sept. 15, 1960 6 Sheets-Sheet 2

INVENTOR.
Henry L. Byland
BY
Wolfe, Hubbard, Voit & Osann
Attys.

Sept. 25, 1962    H. L. BYLAND    3,055,292
QUICK SET PERFORATING APPARATUS
Filed Sept. 15, 1960    6 Sheets-Sheet 3

INVENTOR.
Henry L. Byland
BY
Wolfe, Hubbard, Voit & Osann
Attys.

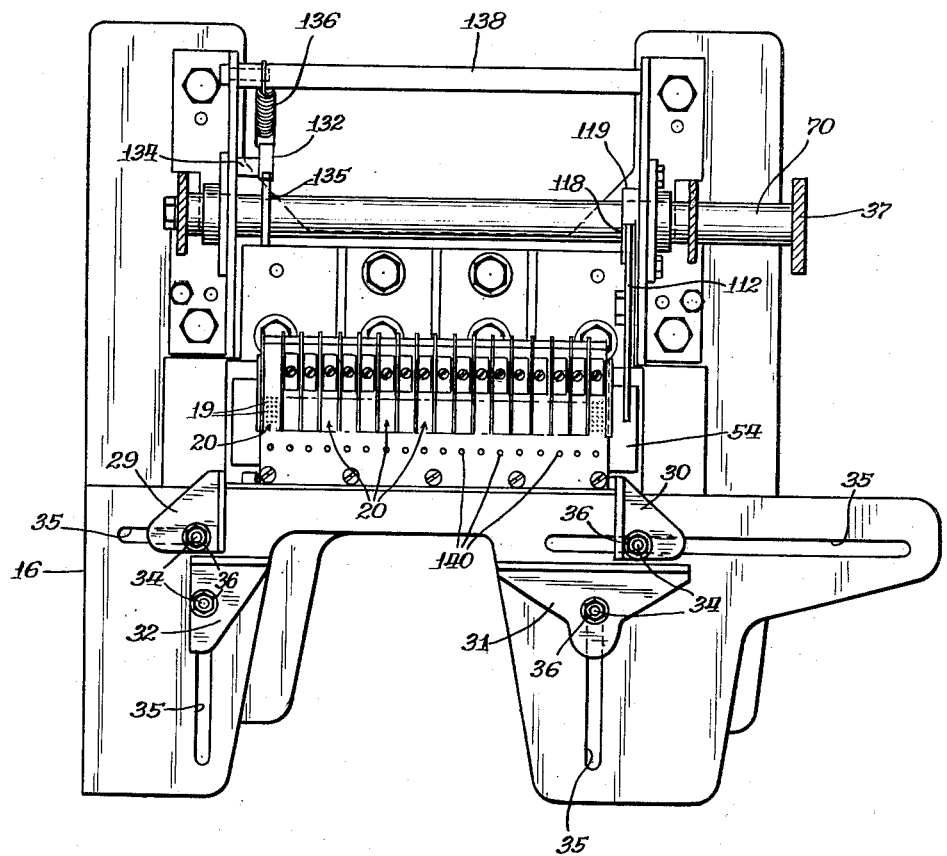

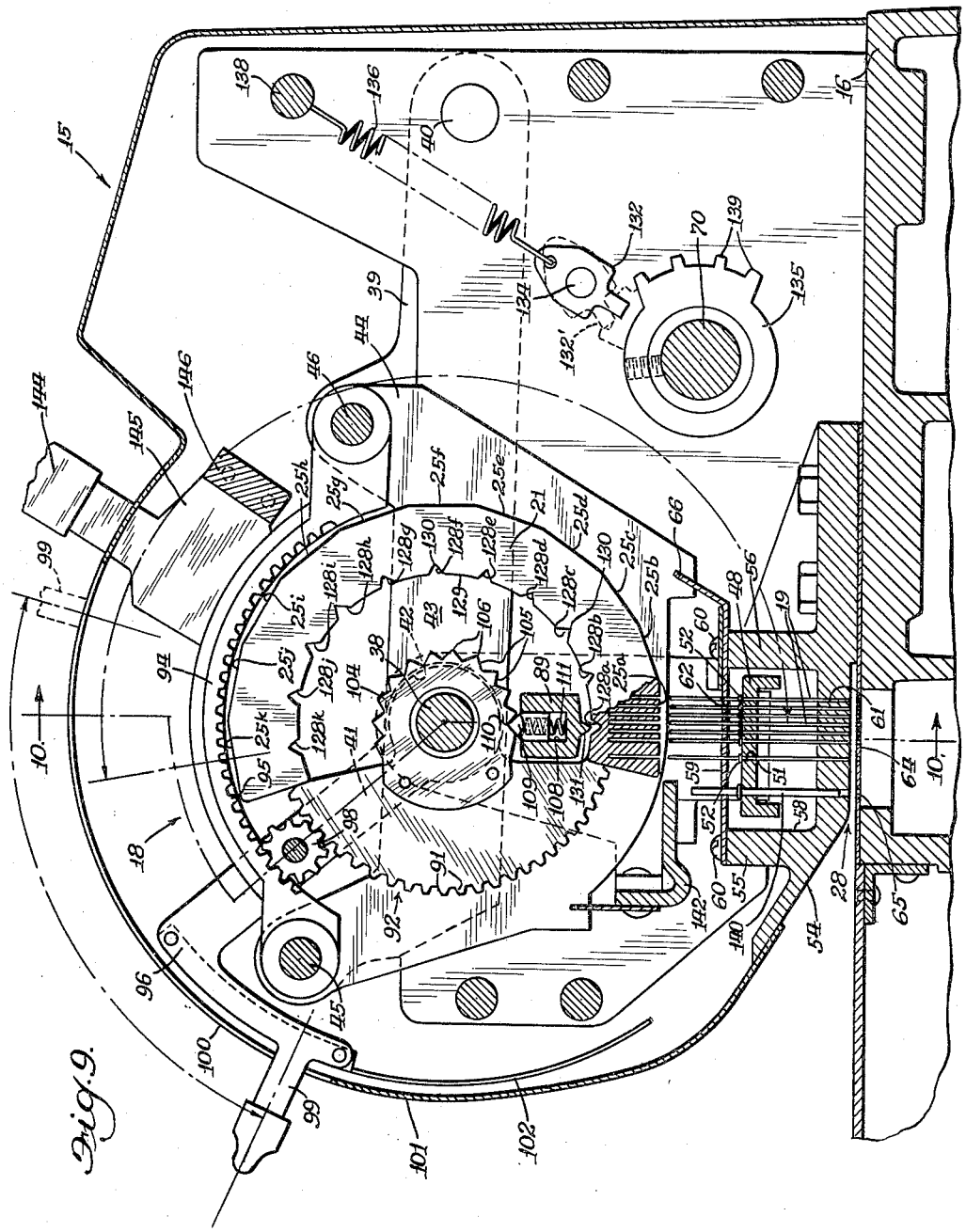

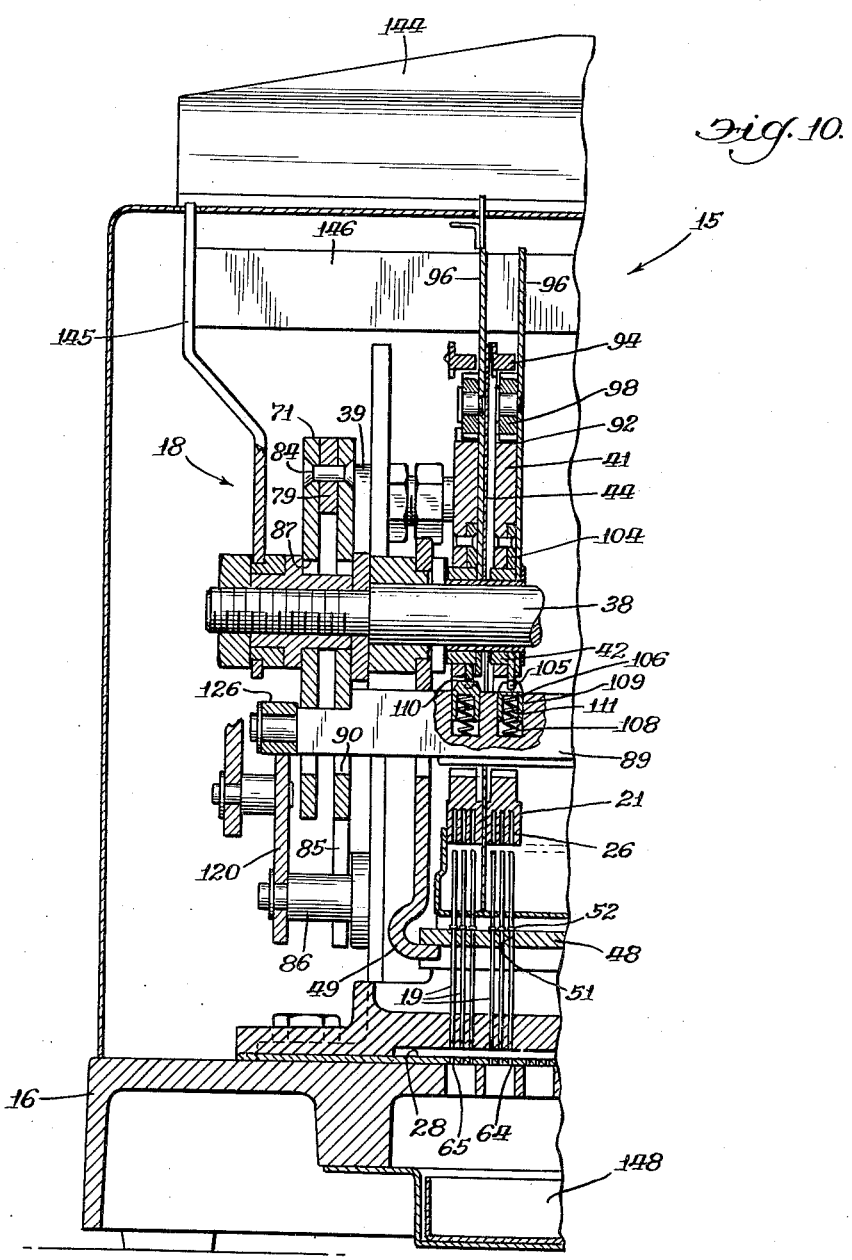

United States Patent Office 3,055,292
Patented Sept. 25, 1962

3,055,292
QUICK SET PERFORATING APPARATUS
Henry L. Byland, Deerfield, Ill., assignor to Cummins-Chicago Corporation, Chicago, Ill., a corporation of Illinois
Filed Sept. 15, 1960, Ser. No. 56,228
6 Claims. (Cl. 101—19)

The present invention relates generally to apparatus for producing patterns of perforations in a document and, more particularly, to an improved perforating apparatus which may be rapidly set up to perforate holes representative of different characters or combinations thereof.

It is a general aim of the present invention to provide improved apparatus for producing a pattern of perforations representative of one or more selected characters. In this connection, it is an object of the invention to provide an improved portable perforating apparatus which may be quickly and easily set up to produce different selected patterns of perforations in a document.

It is a more specific object of this invention to provide a very compact perforating head having an improved coding matrix adapted to selectively and drivingly engage different combinations of punches in an array for producing perforations in a document representative of any one of a plurality of different characters. In this connection, it is an object of the invention to provide a rotatable coding matrix that may be rapidly turned to different positions for drivingly engaging a selected combination of punches representative of a particular character.

Another object of the invention is to provide a portable perforating apparatus that is simple to operate and which can be utilized by untrained personnel. It is a related object of the invention to provide a perforating apparatus wherein the operator need only move a selector lever for each character to be perforated through a short arc in order to select a particular matrix die.

More specifically, it is an object of the invention to provide an improved perforating apparatus for producing perforations representative of a plurality of characters wherein the perforating head is disabled until each coding matrix is properly oriented over the associated array of punches.

These and other objects and advantages of the invention are attained by the construction and arrangement shown as an exemplary embodiment in the accompanying drawings, in which:

FIG. 8 is a sectional view taken substantially along the line 8—8 in FIG. 4;

FIG. 9 is a sectional view, taken substantially along the line 9—9 of FIG. 4, illustrating particularly the selector means associated with one of the coding matrices employed in the present invention; and, FIG. 10 is a fragmentary sectional view taken substantially along the line 10—10 of FIG. 9.

While the invention has been illustrated and will be described in detail with reference to a particular embodiment thereof, there is no intention that it thus be limited to such detail. On the contrary, it is intended here to cover all equivalents, alternatives and modifications within the spirit and scope of the invention as defined by the appended claims.

Figure 1:
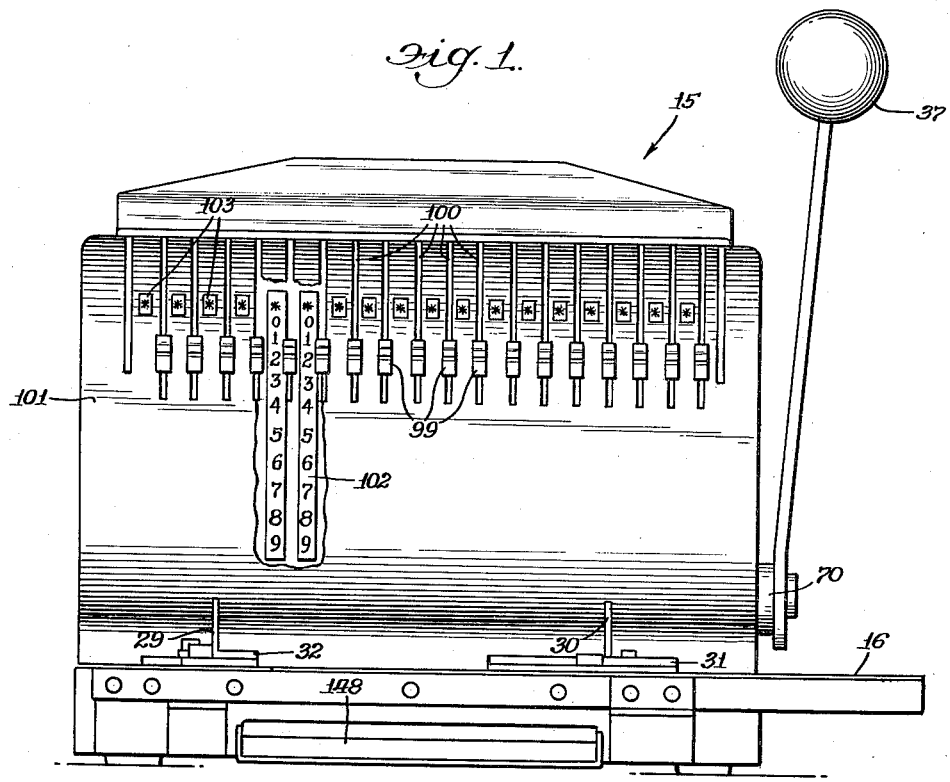
FIGURE 1 is a front elevation of a perforating machine embodying the features of the present invention, and shown partly broken away to illustrate the visual indicating means employed therein.
Figure 3:
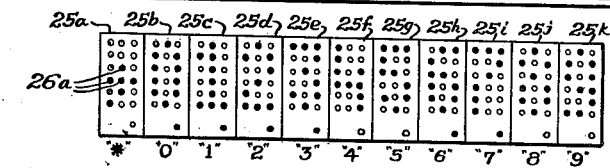
FIG. 3 is a diagrammatic presentation of the different die faces employed in the present invention, each including a typical array of punch receiving openings representative of a particular character.
Figure 4:
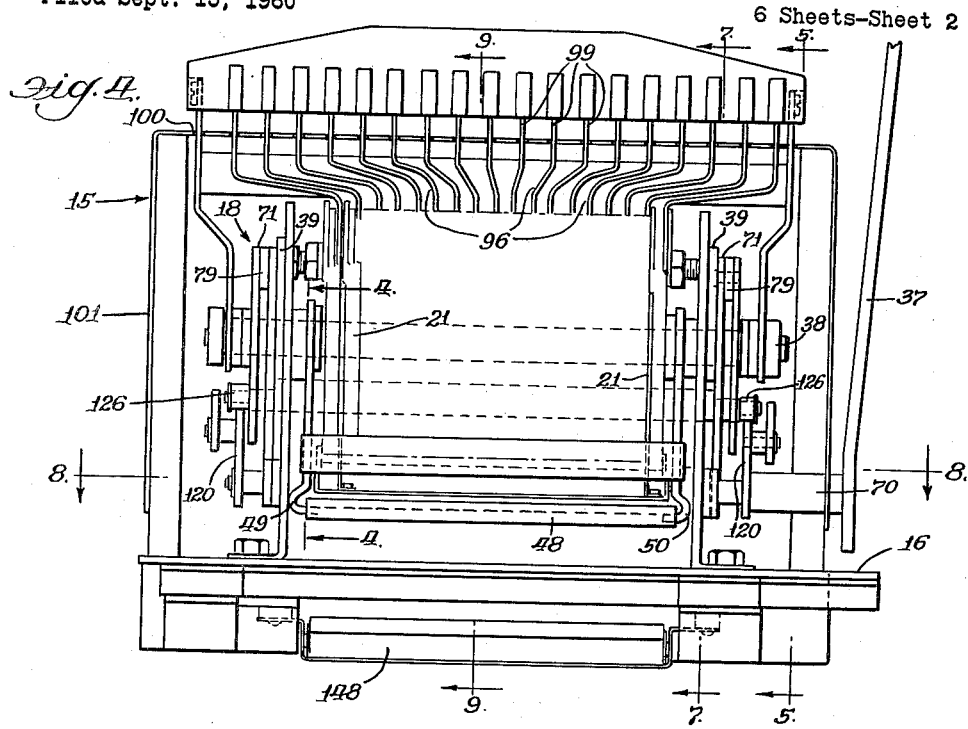
FIG. 4 is a fragmentary front elevation of the present perforating apparatus with a portion of the outer cover removed.

Referring now to FIGS. 1 and 4, the perforating apparatus 15 there shown includes a base 16 and a perforating head, generally indicated at 18. For producing perforations representative of selected characters in one or more documents, the perforating head 18 includes a plurality of punches 19 arranged in a plurality of adjacent 3 x 7 arrays 20 (FIGS. 8 and 10). Each array includes nineteen punches, as will be apparent from FIG. 3, to be described later. Coding matrices 21 are rotatably mounted in the perforating head 18, there being one such matrix disposed over each array 20 of punches 19.

Figure 2:
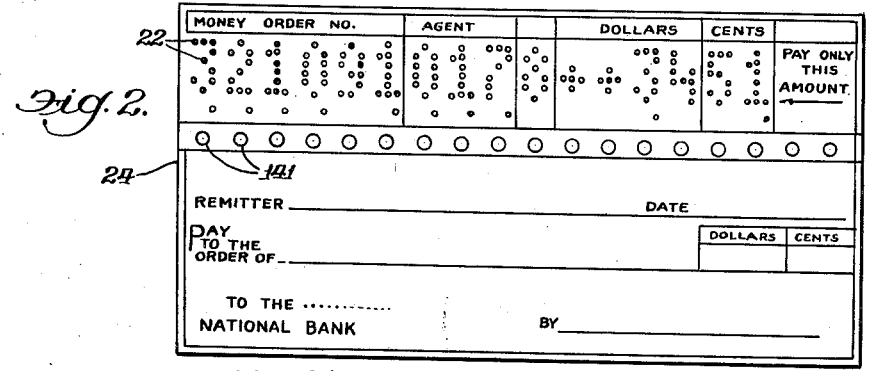
FIG. 2 illustrates a typical document having coded indicia applied thereto in the form of a plurality of arrays of closely spaced perforations.

It will be understood as the description proceeds that the particular configuration of punches 19 in each array 20 is not critical to the present invention. For purposes of clarity, the apparatus will be described in connection with rectangular arrays 20 of punches adapted to perforate holes 22 in a document, here shown as a money order 24 (FIG. 2), representative of legibile characters. Such perforated indicia may be representative of various accounting information, for example, the amount of the money order, an identifying number and the issuing agent. Such information is of great value in modern accounting systems since it may be conveniently "read" by automatic business machines such as sorters, posting machines, computers and the like.

For driving a particular combination of the punches 19 in any one array 20 through the exemplary money order 24, each coding matrix 21 is generally ring-like in configuration (FIG. 9) and formed with a plurality of peripherally disposed planar die faces 25, there being eleven such faces 25a–25k in the preferred embodiment. Each die face 25 is drilled to have a particular combination of punch receiving openings 26, with each combination of openings 26 in any one matrix being representative of a different character. Merely by way of example, a typical set of die faces and their associated openings have been diagrammatically illustrated in FIG. 3, the patterns of opening in exemplary die faces 25a–25k being representative of the characters "+" and "0" through "9", respectively. The openings 26 are disposed in a generally rectangular 3 x 7 array of stations, corresponding to the 3 x 7 array of punches, with a punch receiving opening 26 located at certain stations in a particular array. The die face is solid, that is, has no punch receiving opening at the remaining stations, as shown at 26a and represented by black circles. It will be apparent that the die faces are solid, i.e., have no opening at those stations which are required to represent the different characters.

To facilitate a preliminary understanding of the perforating apparatus 15, a typical operating cycle will be briefly reviewed.

At the start of a perforating cycle, the operator positions the money order 24 or similar document on the base 16 within a document receiving slot 28 (FIGS. 9 and 10) formed in the base beneath the lower ends of the punches 19. In order that different sized documents may be handled by the apparatus, a plurality of adjustable table guides 29–32 (FIG. 8) are mounted on the base 16, each being maintained in the desired adjusted position by means of a bolt 34 extending through an elongated slot 35 and secured in place by a nut 36. As will be described with greater particularity, the operator then rotates each matrix 21 until a selected die face 25 is positioned over the associated array 20 of punches 19. After proper orientation of each matrix 21, the operator pulls the operating lever 37 (FIG. 1) which, through suitable linkage described below, causes simultaneous downward movement of the perforating head 18, punches 19 and matrices 21. As the perforating head 18 moves down, the lower ends of the punches 19 engage the money order 24, thus momentarily blocking further downward movement of the punches. As the head 18 and matrices 21 continue downwardly, the selected die face 25 in each matrix 21 moves into engagement with the upper ends of the punches in its associated array. Those punches finding a punch receiving opening 26 are moved no further, while those punches finding a solid surface or no opening, as indicated at 26a in FIG. 3, are driven downwardly through the money order 24 by the die face 25. Each die face thus shifts a certain pattern of punches to perforate a selected character in the document as the head moves downwardly.

In order to rotatably support each of the matrices 21, a transverse mounting rod 38 is rigidly fixed at its opposite ends to a pair of pivot arms 39 (FIGS. 4, 9 and 10), the latter being pivotally connected by means of pins 40 to the frame of the perforating apparatus 15. Each ring-like matrix 21 includes an arcuate cast segment 41 having an integral hub 42. It will be apparent that each hub 42 and ring-like matrix 21 define an included axially disposed arcuate slot 43 extending therebetween. The hubs 42 are journaled on the mounting rod 38 in side-by-side relationship and held slightly spaced from one another by a plurality of separator plates 44 which mounted on a pair of support rods 45, 46 integral with the perforating head 18.

For supporting the punches in the perforating head with freedom for end-wise movement relative to the head while simultaneously providing means for affirmatively withdrawing the punches from a perforated document, a lifter plate 48 (FIGS. 4 and 10) is mounted on the rod 38. In the preferred embodiment, the lifter plate 48 is carried by a pair of lifter hooks 49, 50 each of which is mounted on the rod 38, there being one hook at each end of the side-by-side array of matrices 21. As is most clearly illustrated in FIGS. 9 and 10, each punch 19 slidably extends through an opening 51 formed in the lifter plate 48 and each punch has formed thereon an integral, enlarged knob or stop 52 disposed intermediate the punch ends and adapted normally to rest upon the upper surface of the lifter plate 48. It will be appreciated that the lifter plate not only supports the punches with freedom for independent slidable end-wise movement within the openings 51, but it also affirmatively withdraws the punches from a perforated document during the upstroke of the perforating head 18 and the mounting rod 38.

To maintain the elongated punches 19 in parallel relationship and properly oriented with respect to the associated matrices, the base 16 of the perforating apparatus 15 has mounted thereon an integral punch support 54 extending transversely across the perforator (FIG. 9). The punch support 54 is provided with a pair of transversely extending spaced ribs 55, 56 defining a channel 58 adapted to loosely contain the lifter plate 48. The upper end of the channel 58 is closed by a guide plate 59 which is rigidly secured to the ribs 55, 56 by means of screws 60 or the like. The bottom portion of the punch support 54 and the guide plate 59 contain alined apertures 61 and 62 registered with the openings 51 in the lifter plate 48, thus positively guiding and supporting each of the punches in a fixed vertical position with freedom for end-wise movement. A die plate 64 (FIG. 10) is rigidly mounted on the base 16 and formed with arrays of openings 65 corresponding to the arrays of punches but spaced from the lower ends thereof.

In order to insure that the lower ends of the matrices are maintained in fixed spaced relation, provision is made for slidably anchoring the bottoms of the respective separator plates 44. This is accomplished in the preferred embodiment by an integral upstanding comb-like flange 66 (FIG. 9) turned upwardly from the guide plate 59. As most clearly illustrated in FIG. 8, the flange 66 has a plurality of slots 68. The lower ends of the separator plates 44 are each slidably received within a respective one of the slots, thus holding the plates properly spaced so that they prevent axial shifting of the matrices 21. If desired, a similar comb-like spacer 69 (FIG. 9) may be mounted on the perforating head 18 in position to receive the forward lower ends of the separator plates 44.

For insuring that the perforating head 18 and matrices are simultaneously driven downwardly relative to the base 16, the operating lever 37 is keyed to a transverse drive shaft 70 (FIG. 4) which extends transversely through the machine. The drive shaft 70 is connected through suitable linkage to a pair of vertical slides 71 located at each end of the matrix assembly and adapted to drive the matrices downwardly, as more fully described below. The linkage for driving the slide 71 is duplicated on each side of the perforator, and for purposes of brevity, only one such linkage will be described.

A shaft cam 72 (FIG. 5) is rigidly mounted on the drive shaft 70 and connected at its lower end 74 to one end of a C-shaped link 75 by means of a pin 76. The other end of the C-shaped link 75 is pivotally connected by means of a pin 78 to one end of an elongated drive link 79, which is in turn coupled with the slide 71 by means of a pin 80. An additional link 81 is pivotally mounted at one end 82 to the frame of the perforating apparatus 15 and coupled at its other end to the medial portion of the drive link by a floating pivot pin 84. For insuring that the downward movement of the slide 71 will be lineal, the lower end of the slide contains a groove 85 which is slidably coupled with and snugly fitted on a pin 86 formed integral with the frame of the perforating apparatus. Additionally, an oversize slot 87 is formed in the slide and positioned to loosely receive one end of the mounting rod 38.

Figure 5:
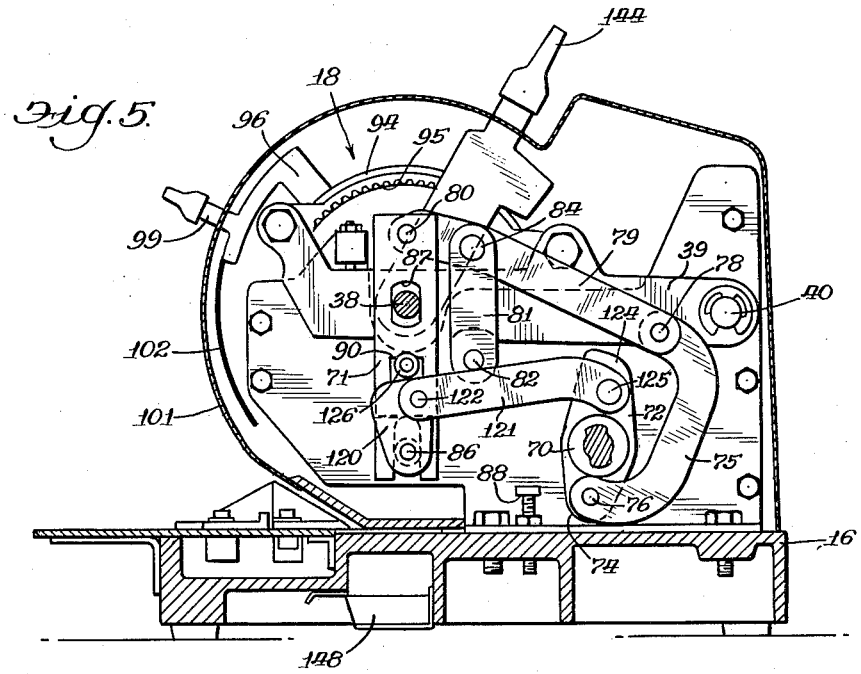
FIG. 5 is a sectional view, taken substantially along the line 5—5 of FIG. 4 showing the linkage for moving the force bar downwardly relative to the article being perforated.
Figure 6:
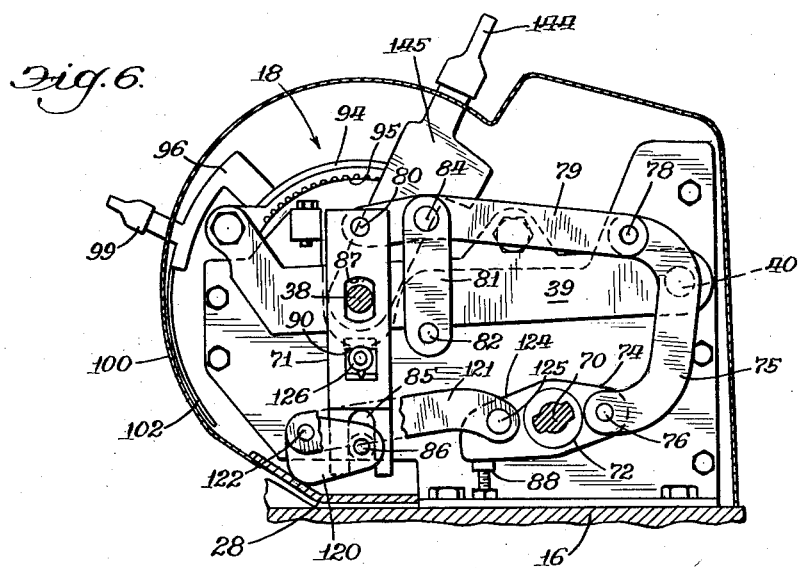
FIG. 6 is a fragmentary sectional view, similar to FIG. 5, disclosing the actuating linkage with the force bar in its lowermost position.

The operation of the drive shaft 70 and linkage is best understood by comparision of FIGS. 5 and 6. When the operating lever 37 is pulled forwardly, the shaft 70 is rotated in a counterclockwise direction, the maximum amount of rotation being limited by abutment of the shaft cam 72 with a fixed stop 88. As the shaft 70 starts its counterclockwise movement, the C-shaped link initially moves rearwardly and thereafter moves upwardly. During the upward portion of movement, the drive link 79 is pivoted in a counterclockwise direction about the floating pivot 84, thus driving the pin 80 and slide 71 downwardly. The downward lineal movement of the slide 71 is transferred to a force bar 89 which extends transversely through the arcuate slot 43 in each of the matrices 21, the ends of the force bar being mounted in oversized openings 90 formed in each slide 71.

In accordance with one of the important aspects of the present invention, provision is made for rapidly setting each of the matrices in a desired indexed position with a minimum of effort and by a very compact arrangement of parts. Movable selector levers are so interconnected with the matrices 21 by distance multiplying devices that a small movement of a lever produces a large range of indexing. As here shown, the cast segment 41 on each of the matrices 21 is provided with a plurality of external gear teeth 91 defining a rotatable arcuate rack 92 (FIG. 9). A plurality of fixed arcuate racks 94, each having internally disposed gear teeth 95, are rigidly mounted on the support rods 45, 46, with each rack 94 radially spaced from a respective one of the racks 92.

A plurality of selector levers having arms 96 are pivotally mounted on the mounting rod 38, there being one arm associated with each ring-like matrix 21 (FIGS. 9 and 10). A planet pinion 98 is rotatably mounted on each selector arm 96 and meshed with both the fixed arcuate rack 94 and the rotatable rack 92 on the associated ring-like matrix.

In order that the operator may properly position each matrix, the selector arms 96 have end portions 99, which respectively project through an associated slot 100 formed in the cover 101 of the perforating apparatus 15 (FIGS. 4 and 9). An arcuate dial or indicator 102, on which the various characters to be perforated are inscribed, is rigidly mounted on each selector arm 96 (FIGS. 1 and 9). The indicator is positioned within the cover 101 in such a manner that movement of the selector arm 96 successively brings the inscribed characters on the indicator into registration with a window 103 formed in the cover of the machine. Thus, the operator need only watch the window to determine which character is selected as the arm 96 is adjusted to rotationally index the associated matrix.

It will be appreciated that the operator may rapidly set up or index the matrices, so they will produce perforation of selected characters in a document, simply by moving the selector arms 96. As each arm is rocked about the mounting rod 38, the associated matrix is rotated through a predetermined arc by means of the intermeshed racks and pinion. Movement of an arm 96 through an arc which makes its planet pinion 98 turn one revolution, because of engagement with the stationary rack 94, will in turn cause the pinion to rotate the rack 92 through a greater arc, since the radius of the latter rack is less than that of the former. A relatively great distance multiplication is thus obtained, so that the range of movement required for the arms 96 may be quite small. Merely by way of example, it has been found that movement of the matrix 21 through an arc of approximately 190° to selectively present any of the die faces 25 to the punches 19, can be accomplished by only moving the selector arm through an arc of approximately only 80°.

In keeping with the present invention, provision is made for insuring that the die faces selected by the operator are properly oriented with respect to their associated punch arrays. This is accomplished in the preferred embodiment (FIGS. 9 and 10) by fixing an arcuate detent plate 104 having a series of V-shaped notches 105 formed therein, to each matrix hub 42, the notches defining detent openings each separated by a knife edge 106. The force bar 89, which extends through the slots 43 in each of the matrices 21, has formed in the upper surface thereof a plurality of bores 108 each respectively located below a different hub 42 and detent plate 104. A detent 109 having a knife edge 110 is mounted in each bore 108 and is urged outwardly into engagement with the detent openings 105 formed in the plate 104 by means of springs 111. Thus, as the matrices and their associated hubs are rotated, the spring biased detents 109 are urged into the detent openings 105. The provision of knife edges 106 and 110 on detent plate and detent respectively, substantially eliminates any possibility that the matrix will be improperly oriented relative to the associated punch array 20.

Figure 7:
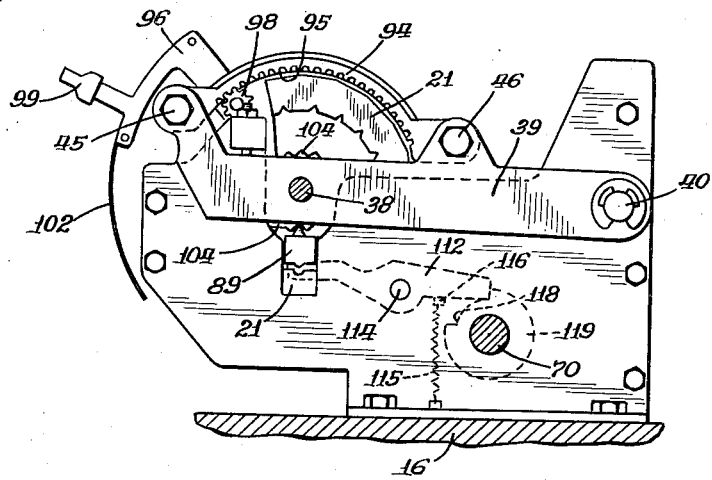
FIG. 7 is a fragmentary sectional view, taken substantially along the line 7—7 of FIG. 4, illustrating the interference mechanism employed for preventing downward movement of the force bar and code matrices when the matrices are not properly oriented.

In carrying out the present invention, provision is made for disabling the perforating head 18 each time that any one of the ring-like matrices is improperly oriented, i.e., is not squarely registered with its respective punch array. This is accomplished by pivotally mounting an interference lever 112 (FIGS. 7 and 8) on a pin 114 formed integral with the frame of the perforating apparatus 15. As viewed in FIG. 7, the interference lever is normally urged in a clockwise direction by a tension spring 115. The right hand end of the lever is normally received with a notch 118 cut in a cam plate 119 fixed to the drive shaft 70.

For pivoting the interference lever 112 in a counterclockwise direction so as to shift its right end free of the cam plate 119 and allow full rotation of the drive shaft 70, the end of the lever is driven downwardly by the force bar 89 during initial rotation of the drive shaft 70 only when each of the matrices are properly oriented. To accomplish this, the force bar 89 is normally cammed into its uppermost position (FIG. 5), with the detent springs 111 compressed, by a pair of lift cams 120 on either side of the array of matrices 21. Since the lift cams are identical in configuration and actuated in the same manner, it is only necessary to describe the actuating linkage for one. The lift cam 120 is pivoted to the frame by the pin 86. The cam 120 is connected to the drive shaft 70 by a link 121 which is connected at one end to the lift cam by a pivot pin 122 and at its other end to the upper portion 124 of the shaft cam 72 by a pivot pin 125. Prior to actuation of the operating lever 37 and the drive shaft 70 (FIGS. 5 and 10), the lift cam 120 is in its uppermost position and engaged with a cam roller 126 mounted on the end of the force bar 89, thus urging the force bar upwardly.

For permitting the force bar to drop down when the matrices are properly oriented and simultaneously pivoting the interference lever 112 out of engagement with the cam plate 119 on the drive shaft 70, the inner edges 129 of the matrices are formed with a plurality of V-shaped notches 128a–128k (FIG. 9) which respectively are centered inwardly from the die faces 25a–25k. The notches are positioned so that their apices define the outer radial edge 130 of the arcuate slot 43. The lower surface of the force bar 89 has formed thereon a downwardly depending V-shaped rib 131 positioned to be received within one of the notches 128a–128b in each matrix when the force bar drops due to disengagement of the lift cams 120. It will be understood that the notches 128a–128k in each matrix are so positioned that when the matrices are properly oriented relative to the punch arrays, one will be alined to receive the downwardly depending V-shaped rib 131. On the other hand, should any one or more of the matrices be improperly oriented, it will be apparent that its notches will be misalined relative to the rib 131. Accordingly, when the force bar is released by the cam 120, its downward movement is blocked by engagement of the V-shaped rib 131 with the inner surface 129 on the misalined matrix.

Briefly summarizing the operation of the interference mechanism (FIGS. 5 and 6), it will be understood that after the operator has selected the appropriate die face 25 on each of the matrices 21, he pulls the operating lever 37 forwardly to rotate the shaft 70. During the initial portion of drive shaft rotation, the shaft cams 72 move in a counterclockwise direction causing the lift cams 120 to pivot in a counterclockwise direction and disengaging them from the cam rollers 126 on the force bar 89. During this initial portion of cam shaft rotation, the C-shaped links 75, which are also connected to the shaft cam 72, are moving rearwardly. If the matrices are properly alined the force bar 89 drops downwardly due to its own weight and to the bias provided by the detent springs 111, thus pivoting the interference lever 112 in a counterclockwise direction and disengaging its right end from the notch 118 in the cam plate 119 on the drive shaft 70, permitting the drive shaft to be rotated through a full rotational stroke. However, should one or more of the matrices 21 be improperly oriented, downward movement of the force bar is blocked by engagement of its rib 131 with the inner edge 129 of the improperly oriented matrix. When the force bar is prevented from dropping, the interference lever 112 remains in the notch 118, engages the end thereof, and prevents further shaft rotation, thus blocking downward driving movement of the slides 71. In this way, damaging or bending of the punches 19 is prevented, because the lever 37 is positively blocked if any of the matrix die faces is not exactly registered with its punches.

To insure that the selected punches are driven through the document to be perforated when the matrices are properly oriented, provision is made for forcing the operator to move the operating lever 37 and drive shaft 70 through a full rotational stroke. To accomplish this, a full stroke pawl 132 (FIG. 9) is pivotally mounted at 134 to the frame of the perforating apparatus 15. The pawl 132 is engaged with a detent plate 135 rigidly mounted on the drive shaft 70. One end of a tension spring 136 is anchored at 138 to the frame of the perforating apparatus 15 and connected at its other end to the pawl 132 for insuring that the pawl is maintained in positive engagement with the detent plate 135 during movement of the operating lever 37. As the drive shaft 70 is rotated and the slides 71 start their downward movement, the pawl 132 engages the teeth 139 formed on the detent plate 135 with a ratchet-like action, the pawl assuming the dotted line position 132' shown in FIG. 9. Since the pivot 134 is a fixed pivot, it will be apparent that the shaft 70 cannot be rotated in a clockwise direction until after the pawl 132 has traversed all of the teeth 139, thereby insuring that the shaft is rotated through one full stroke and forcing the slides downwardly through one full stroke.

In order to expedite handling of a perforated document by automatic processing machinery, a plurality of sprocket hole punches 140 (FIGS. 8 and 9) are mounted in the perforating head 18 in a manner similar to the character perforating punches 19. The sprocket hole punches 140 are spaced at equal intervals across the perforating apparatus 15 and located in front of the punch arrays 20. For driving the sprocket hole punches downwardly to form a series of sprocket holes 141 (FIG. 2) in the document 24, an elongated plate 142 (FIG. 9) is rigidly mounted on the perforating head 18 in position to overlie the upper ends of the punches 140. Thus, as the perforating head moves downwardly during a perforating operation, the plate 142 engages the upper end of the sprocket hole punches and drives them downwardly through the document.

For simultaneously resetting all of the selector arms 96 and the associated matrices 21 to their starting position subsequent to a perforating operation, a reset lever 144 is mounted on a pair of arms 145 that are pivotally connected to the mounting rod 38. A transverse plate 146 is rigidly connected at its opposite ends to the arms 145 and extends across the perforating apparatus 15 behind each of the selector arms 96. Upon completion of a perforating operation, it is only necessary for the operator to grasp the reset lever 144 and pull it forwardly, thus causing the plate 146 to engage all of the selector arms 96 and drive them forwardly to their lowest positions. This, in turn, indexes all of the matrices 21 to positions at which the first die face thereon is disposed over the associated punches.

The operation of the perforating apparatus 15 may be briefly summarized, as follows: The operator positions the document to be perforated, for example, the money order 24 (FIG. 2) on the base 16 within the document receiving slot 28, the money order being accurately oriented by means of the adjustable table guides 29–32. He then quickly sets up the matrices 21 by simply moving each of the selector arms 96 through a slight arc until the desired characters to be perforated are visible through the windows 103 in the cover 101 of the perforating apparatus 15. As the selector arms are pivoted, the associated matrices 21 are rapidly rotated through a greater arc due to the distance multiplication provided by the intermeshed racks 92, 94 and planet pinions 98. The operator then pulls the operating lever 37 (FIG. 1) downwardly, effecting initial counterclockwise rotation of the drive shaft 70 (FIGS. 5 and 6). During the initial shaft rotation, the shaft cam 72, through link 121, pivots the lift cams 120 in a counterclockwise direction, thus disengaging them from the cam rollers 126 on the force bar 89. Simultaneously, the C-shaped link 75 is moved rearwardly.

With the lift cams 120 disengaged, the force bar 89 is free to drop under its own weight and the bias of the detent springs 111 (FIG. 9), provided that each matrix 21 is properly oriented relative to its associated punch array 20. As the force bar 89 drops, it engages the interference lever 112 (FIG. 7), pivoting the latter in a counterclockwise direction and disengaging it from the cam plate 119 on the drive shaft 70, thus disabling the interference mechanism and allowing the drive shaft to be moved through a full stroke.

Continued rotation of the operating lever 37 and drive shaft 70 through a full stroke, as insured by the pawl 132, causes the C-shaped links 75 to move upwardly, thus pivoting the drive links 79 in a counterclockwise direction and driving each of the slides 71 downwardly. As the slides move down, the upper edges of the oversized slots 90 in the slides engage the force bar and drive it downwardly, causing the selected die faces 25 on all of the matrices 21 to simultaneously engage their respective arrays 20 of punches 19, thus driving selected punches through the money order 24 and effecting perforation thereof. Simultaneously, the plate 142 engages the sprocket hole punches 140 and drives them through the money order to form sprocket holes 141 therein. The chads punched out of the money order are collected in a removable tray 148 which is mounted in the base 16 under the die block 64.

After perforation of the money order 24, the operator returns the operating lever 37 to its starting position, thus rotating the drive shaft 70 in a clockwise direction (FIG. 5), and effecting upward lineal movement of the slides 71. As the slides 71 move upwardly, the lower end of the oversized slots 87 formed therein engage the mounting rod 38 to simultaneously raise all of the matrices 21 together with the lifter hooks 49, 50 and lifter plate 48. This affirmatively withdraws all the punches from the money order. Additionally, the lift cams 120 are rotated in a clockwise direction (FIG. 6) so as to engage the cam rollers 126 on the force bar 89 and raise the force bar rib 131 out of the V-shaped notches 128 in the matrices 21.

It will be appreciated that the present perforating apparatus may be rapidly set up to perforate different patterns of holes representing different characters. It is only necessary to move a selector arm through a very short arc in order to selectively present any desired die face of each matrix ring to the array of punches. Moreover, it will be appreciated that the interference mechanism prevents the downward movement of the perforating head in the event that one or more matrices are not properly oriented, thus effectively eliminating the danger of damage to the punches and the possibility of driving an entire array of punches through the document to be perforated.

I claim as my invention:

1. In a perforating apparatus, the combination comprising, a perforating head, a ring-like matrix mounted in said head for rotation about an axis, said matrix including a plurality of peripherally disposed die faces with each die face having a different combination of punch receiving openings formed therein, each of said combinations corresponding to a particular character, a selector arm pivotally mounted on said head and manually rotatable about said axis, and means rotatably mounted on said arm intermediate the ends thereof for peripherally engaging said matrix to rotate the latter through an angle greater than that through which said arm is moved.

2. In a perforating apparatus, the combination comprising, a perforating head, a ring-like matrix mounted in said head for rotational indexing about an axis, said matrix including a plurality of peripherally disposed die faces with each die face having a different combination of punch receiving openings formed therein, each of said combinations corresponding to particular character, a selector arm mounted on said head and manually rotatable about said axis, a first arcuate rack on said matrix, a second arcuate rack fixed on said head and spaced from said first rack, said first and second racks being concentric about said axis with the latter having a greater radius than the former, and a planet pinion journaled on said arm and meshed with each of said racks.

3. In a perforating apparatus, the combination comprising, a perforating head, a mounting rod extending transversely through said head, a plurality of ring-like matrices rotatably mounted side-by-side on said rod, each of said matrices including a plurality of peripherally disposed die faces with the die faces in any one matrix each having a different combination of punch receiving openings formed therein, each of said combinations corresponding to a particular character, a plurality of manually rotatable selector arms pivotally mounted on said rod with each selector arm associated with a different one of said matrices, and means rotatably mounted on each of said arms intermediate the ends thereof for peripherally engaging the associated matrix for rotating the latter through an angle greater than that through which the former is moved.

4. In a perforating apparatus, the combination comprising, a perforating head, a mounting rod extending transversely through said head, a plurality of ring-like matrices rotatably mounted on said rod, a plurality of die faces disposed about a peripheral segment of each of said matrices, the die faces in any one matrix each having a different combination of punch receiving openings formed therein, each of said combinations corresponding to a particular character, a first arcuate rack formed on a peripheral segment of each of said matrices, a plurality of second arcuate racks rigidly mounted on said head with each of said second racks being of greater radius than and concentrically spaced from a corresponding one of said first racks, a plurality of selector arms pivotally mounted on said rod with each selector arm associated with a different one of said matrices, and a planet pinion journaled on each of said arms and meshed with the corresponding first and second racks.

5. In a perforating apparatus, the combination comprising, a perforating head, a mounting rod extending transversely through said head, a plurality of ring-like matrices rotatably mounted on said rod, a plurality of die faces disposed about a peripheral segment of each of said matrices, the die faces in any one matrix each having a different combination of punch receiving openings formed therein, each of said combinations corresponding to a particular character, a first arcuate rack formed on a peripheral segment of each of said matrices, a plurality of second arcuate racks rigidly mounted on said head with each of said second arcuate racks being of greater radius than and concentrically spaced from a corresponding one of said first racks, a plurality of selector arms pivotally mounted on said rod with each selector arm associated with a different one of said matrices, a planet pinion journaled on each of said arms and meshed with the corresponding first and second spaced racks, an arcuate scale fixed to each of said arms and having indicia circumferentially spaced thereon to represent different characters, a cover enclosing said head with said arms projecting through slots therein, and a window in said cover adjacent each arm and located to render visible the indicia for one character on the associated arm as the latter is set in different angular positions, thereby to indicate the angular setting of the corresponding matrix.

6. In a perforating apparatus, the combination comprising, a perforating head, an array of punches carried by said head with freedom for end-wise movement relative thereto, a ring-like matrix rotatably mounted on said head, said matrix including a plurality of peripherally disposed die faces with each face having a different combination of punch-receiving openings formed therein, each combination corresponding to said array of punches and each representing a particular character, means for orienting a selected die face over said array of punches, a drive shaft extending through said head, interference means engaged with said drive shaft permitting only a limited amount of shaft rotation, said matrix having an arcuate axial opening formed therein, a force bar extending through said opening, means urging said force bar towards the outer radial edge of said opening so as to disable said interference means upon engagement with the outer radial edge of said opening, linkage coupling said drive shaft and said force bar for effecting downward lineal movement of the bar upon rotation of said drive shaft in excess of said limited amount, a lift cam connected to said linkage for maintaining said force bar spaced from the outer radial edge of said opening, means affecting initial rotation of said drive shaft for disengaging said lift cam from said force bar, and means permitting movement of said force bar into engagement with the radial outer edge of said opening only when the selected die face is properly oriented relative to said array of punches.

References Cited in the file of this patent

UNITED STATES PATENTS

| | | |
|---|---|---|
| 422,728 | Clark | Mar. 4, 1890 |
| 1,909,141 | Woodward et al. | May 16, 1933 |
| 2,589,271 | Miller | Mar. 18, 1952 |
| 2,682,308 | Miller | June 29, 1954 |
| 2,723,719 | Mantonya | Nov. 15, 1955 |